US010332352B2

(12) United States Patent
Bennett et al.

(10) Patent No.: US 10,332,352 B2

(45) Date of Patent: Jun. 25, 2019

(54) GAMING MACHINE WITH A FIXED WILD SYMBOL

(71) Applicant: Aristocrat Technologies Australia Pty Limited, North Ryde, NSW (AU)

(72) Inventors: Nicholas Luke Bennett, Rosebery (AU); Natalie Bryant, Cherrybrook (AU)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 17 days.

(21) Appl. No.: 15/859,149

(22) Filed: Dec. 29, 2017

(65) Prior Publication Data

US 2018/0211488 A1 Jul. 26, 2018

Related U.S. Application Data

(63) Continuation of application No. 13/788,801, filed on Mar. 7, 2013, now Pat. No. 9,858,762, which is a (Continued)

(30) Foreign Application Priority Data

Mar. 31, 2000 (AU) ........................................ PQ6637

(51) Int. Cl.

*A63F 13/00* (2014.01)
*G07F 17/32* (2006.01)
*G07F 17/34* (2006.01)

(52) U.S. Cl.

CPC .......... *G07F 17/3267* (2013.01); *G07F 17/34* (2013.01)

(58) Field of Classification Search

CPC .............................. G07F 17/3267; G07F 17/34

See application file for complete search history.

(56) References Cited

U.S. PATENT DOCUMENTS

| | | | |
|---|---|---|---|
| 5,178,389 | A | 1/1993 | Bentley et al. |
| 5,188,363 | A | 2/1993 | Marnell et al. |

(Continued)

FOREIGN PATENT DOCUMENTS

| | | | |
|---|---|---|---|
| AU | 43488/99 | | 3/2000 |
| GB | 1528507 | | 10/1978 |
| GB | 2243236 | A | 10/1991 |

OTHER PUBLICATIONS

International Search Report of PCT/AU01/00323, dated Apr. 24, 2001.

(Continued)

*Primary Examiner* — David L Lewis

*Assistant Examiner* — Eric M. Thomas

(74) *Attorney, Agent, or Firm* — McAndrews, Held & Malloy, Ltd.

(57) ABSTRACT

A gaming machine has a display and a game controller arranged to control images displayed on the display. The game controller is arranged to play a spinning reel game wherein one or more random events are caused to be displayed on the display and, if a predefined winning event occurs, the machine awards a prize. When at least one special symbol appears on the display, the special symbol is held in a superimposed representation in that position for at least one further game while at least that reel carrying the special symbol is re-spun for the at least one further game.

16 Claims, 9 Drawing Sheets

Related U.S. Application Data continuation of application No. 13/626,574, filed on Sep. 25, 2012, now Pat. No. 8,876,588, which is a continuation of application No. 11/856,613, filed on Sep. 17, 2007, now Pat. No. 8,298,064, which is a continuation of application No. 10/182,318, filed as application No. PCT/AU01/00323 on Mar. 23, 2001, now Pat. No. 7,326,113.

(56) References Cited

U.S. PATENT DOCUMENTS

| | | | | |
|---|---|---|---|---|
| 5,542,669 | A | 8/1996 | Charron et al. | |
| 5,823,874 | A | 10/1998 | Adams | |
| 5,971,849 | A | 10/1999 | Falciglia | |
| 5,976,016 | A | 11/1999 | Moody et al. | |
| 6,086,066 | A * | 7/2000 | Takeuchi | G07F 17/3211 273/138.2 |
| 6,089,977 | A | 7/2000 | Bennett | |
| 6,120,378 | A | 9/2000 | Moody et al. | |
| 6,146,273 | A | 11/2000 | Olsen | |
| 6,251,013 | B1 * | 6/2001 | Bennett | G07F 17/3211 273/143 R |
| 6,311,976 | B1 | 11/2001 | Yoseloff et al. | |
| 6,364,313 | B1 | 4/2002 | Moody | |
| 6,386,975 | B1 | 5/2002 | Peterson | |
| 6,390,916 | B1 | 5/2002 | Brown | |
| 6,439,995 | B1 | 8/2002 | Hughs-Baird et al. | |
| 6,485,367 | B1 | 11/2002 | Joshi | |
| 7,115,033 | B1 | 10/2006 | Timperley | |
| 7,237,775 | B2 | 7/2007 | Thomas et al. | |
| 7,326,113 | B2 | 2/2008 | Bennett et al. | |
| 8,298,064 | B2 | 10/2012 | Bennett et al. | |
| 8,876,588 | B2 | 11/2014 | Bennett et al. | |
| 9,858,762 | B2 | 1/2018 | Bennett et al. | |
| 2002/0045474 | A1 | 4/2002 | Singer et al. | |
| 2003/0013517 | A1 | 1/2003 | Bennett et al. | |
| 2005/0288090 | A1 * | 12/2005 | Thomas | G07F 17/3286 463/20 |
| 2008/0070673 | A1 | 3/2008 | Bennett et al. | |
| 2013/0023334 | A1 | 1/2013 | Bennett et al. | |
| 2013/0184058 | A1 | 7/2013 | Bennett et al. | |

OTHER PUBLICATIONS

International Preliminary Examination Report of PCT/AU01/00323, dated Sep. 20, 2001.

A Complaint was filed Mar. 16, 2015, *IGT* v. *Aristocrat Technologies, Inc.*, Case No. 2:15-cv-00473, in the United States District Court for the District of Nevada. A parent patent to this application (U.S. Pat. No. 8,298,064) was asserted in this litigation.

* cited by examiner

GAMING MACHINE WITH A FIXED WILD SYMBOL

CROSS-REFERENCE TO RELATED APPLICATION(S)

This application claims priority to and is a continuation of U.S. application Ser. No. 13/788,801, having a filing date of Mar. 7, 2013, expected to issue as U.S. Pat. No. 9,858,762 on Jan. 2, 2018, which is a continuation of U.S. application Ser. No. 13/626,574 having a filing date of Sep. 25, 2012, now issued U.S. Pat. No. 8,876,588, which is a continuation of U.S. patent application Ser. No. 11/856,613 having a filing date of Sep. 17, 2007, now U.S. Pat. No. 8,298,064, which claims priority to U.S. patent application Ser. No. 10/182,318, having a filing date of Jul. 26, 2002, now issued U.S. Pat. No. 7,326,113, which claims priority of International Application No. PCT/AU01/00323, having a filing date of Mar. 23, 2001, which in turn claims priority of Australian Application No. PQ 6637, having a filing date of Mar. 31, 2000, all which are incorporated herein by reference in their entirety.

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a spinning reel game wherein one or more random events are caused to be displayed on the display means and, if a predefined winning event occurs, the machine awards a prize, the gaming machine being characterized in that, when at least one special symbol appears on the display means, said at least one special symbol is held in a superimposed representation in that position for at least one further game while at least that reel carrying the, or each, special symbol is re-spun for said at least one further game.

The invention is intended particularly for spinning reel-type games and, more specifically, video simulations of such games. The at least one special symbol may be carried into position on one of the reels and may remain in position to be superimposed over an underlying symbol of that reel when the reel is re-spun. The special symbol may be at least partially transparent so that an underlying symbol is visible beneath it.

It will be appreciated that more than one special symbol may appear at any one time and more than one special symbol may remain in its position for a series of games.

In one embodiment of the invention, said at least one special symbol, when it occurs in a bought, base game may be held for a predetermined number of succeeding bought, base games.

In another embodiment of the invention, each special symbol may be held following the occurrence of a predetermined trigger condition, the trigger condition being associated with the special symbols and the trigger condition commencing a series of free games during which all special symbols that are spun up are held. Thus, for example, special symbols may only be held when three or more of the special symbols have been spun up.

Instead, some other trigger condition, independent of the special symbols, may commence a series of free games during which all special symbols that are spun up are held.

The held special symbols may be superimposed over the underlying spinning reels when the reels are spun for succeeding games in the series of free games.

Any special symbol spun up in any one game of the series of free games may be held for a predetermined number of following games in the series of free games. Thus, for example, each special symbol may be held for the following ten free games in the series of free games.

Further, if the trigger condition re-occurs in one of the games of the series of free games, a further series of free games may be awarded. The free games of the further series of free games may be added to any remaining games of a preceding series of free games. Any special symbol held during a game of said preceding series of free games may also be held for at least certain games of the further series of free games.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
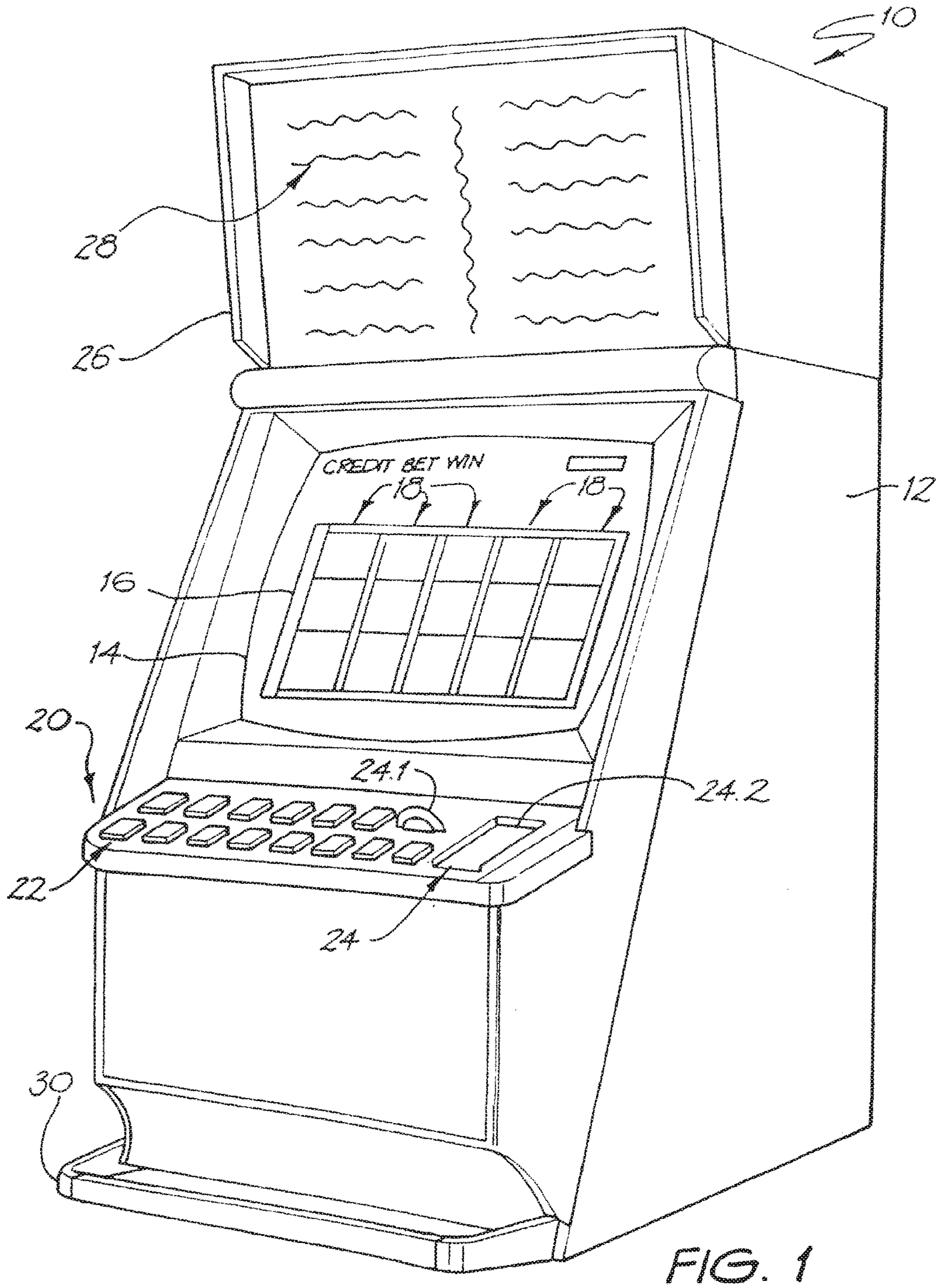
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
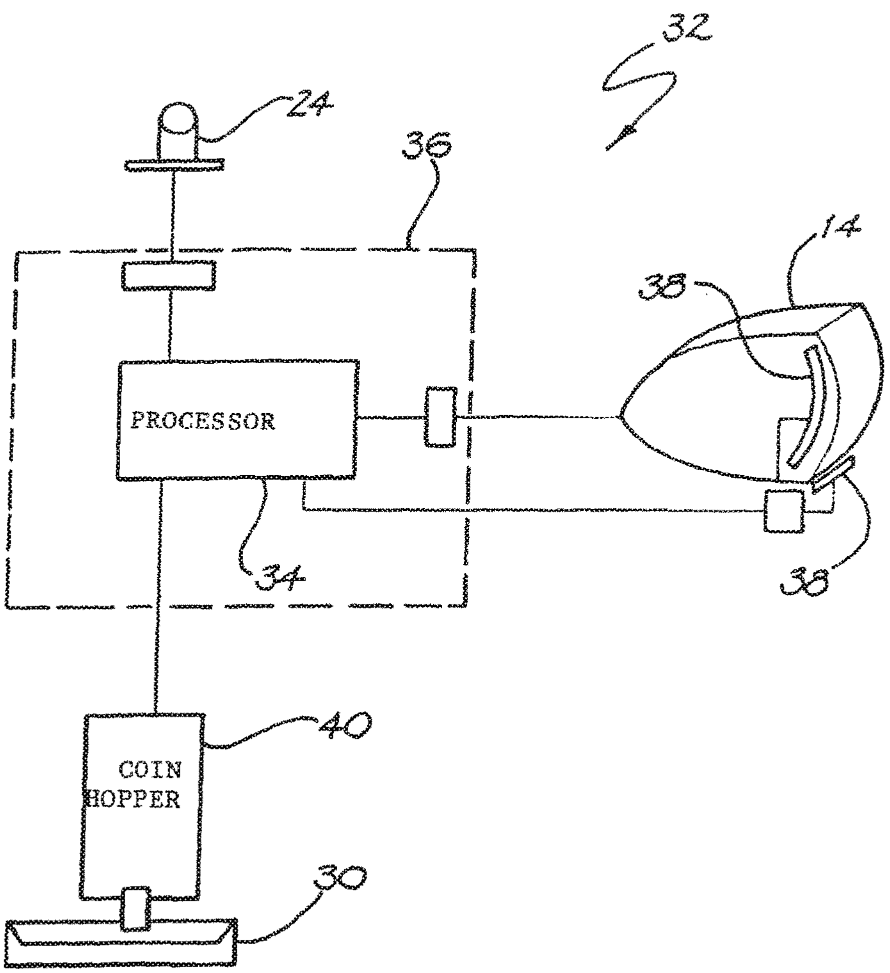
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 6:
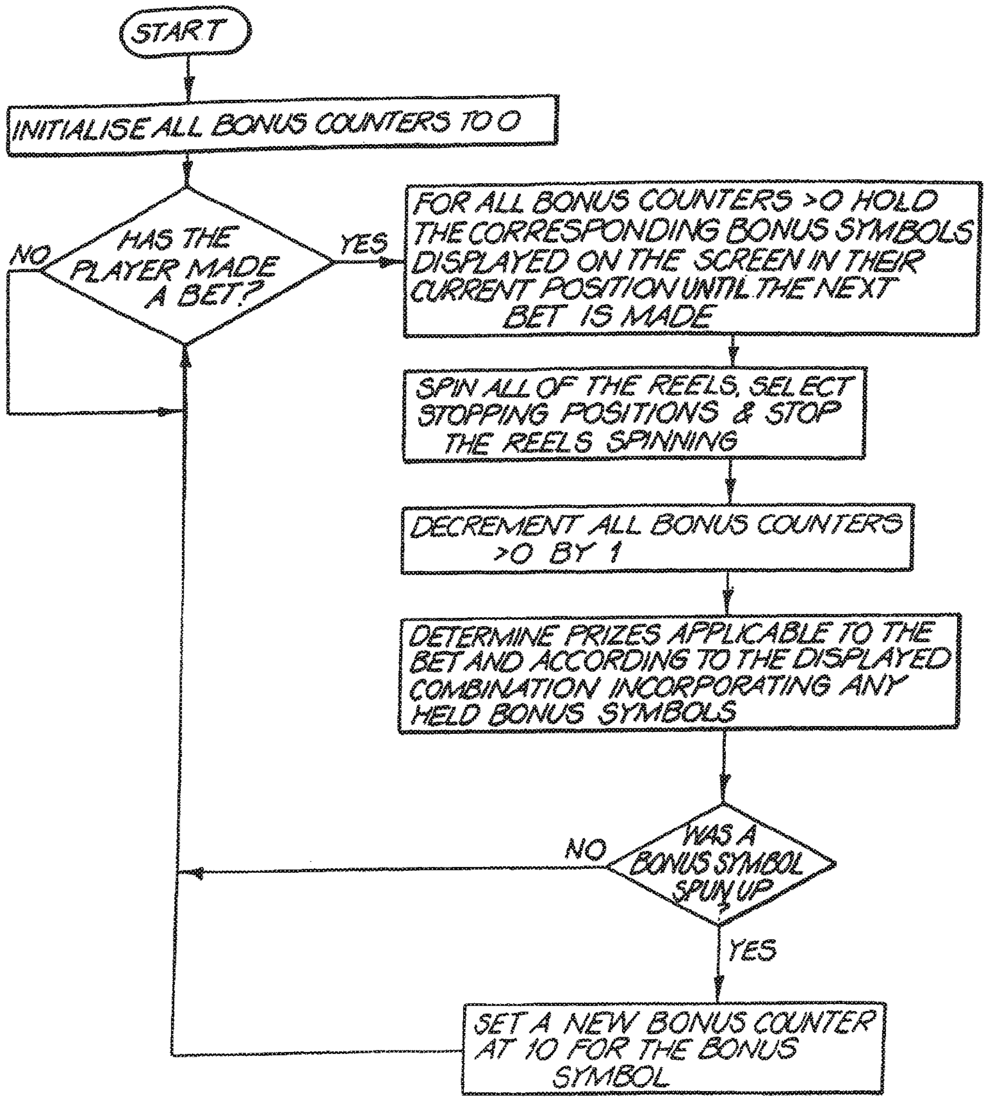
FIG. 6 shows a flow chart of the embodiment of the invention shown in FIGS. 3*a* to 3*f*.
Figure 7:
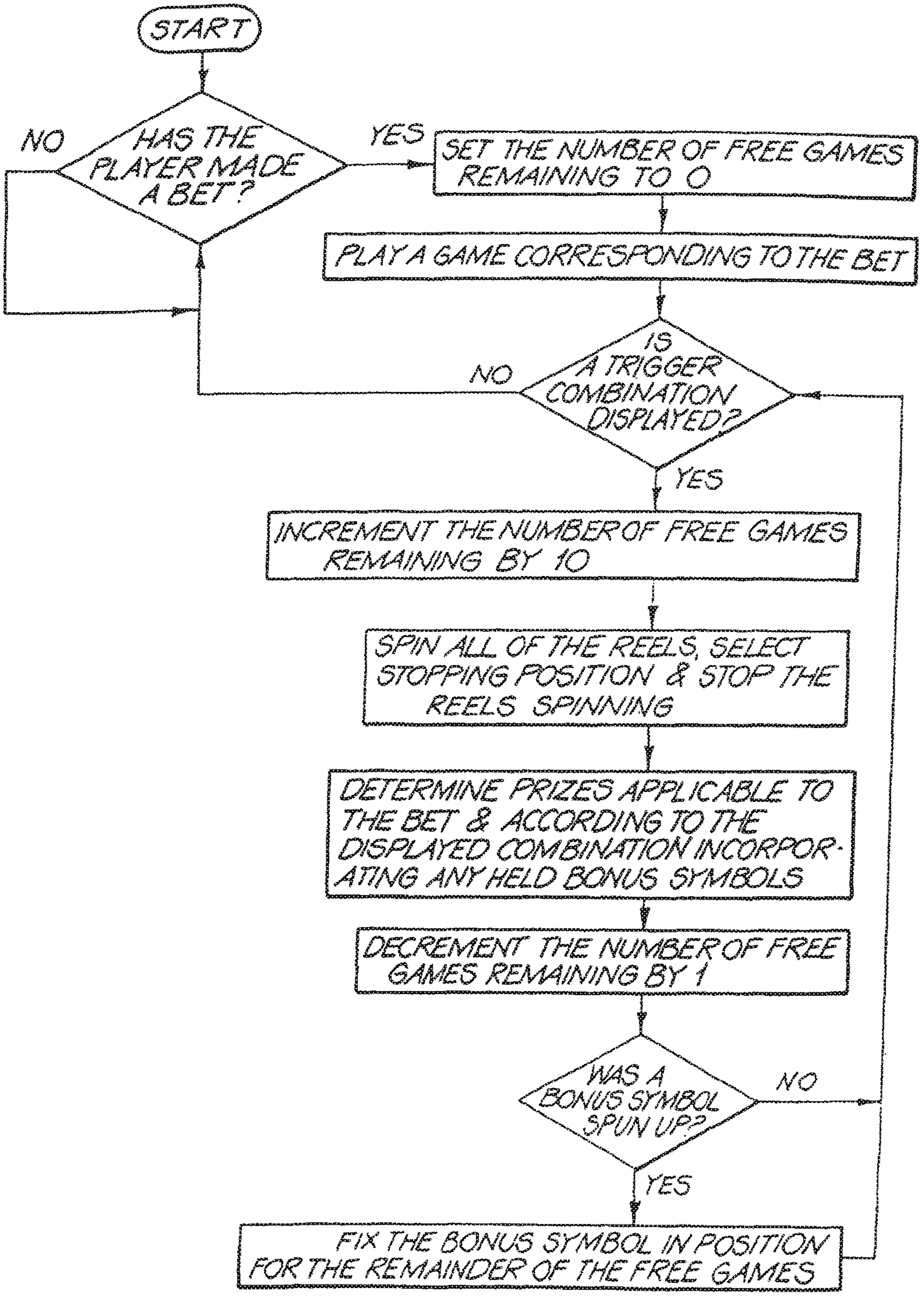
FIG. 7 shows a flow chart of the embodiment of the invention shown in FIGS. 4 and 5*a* to 5*c*.

Referring now to FIGS. **3*a* to 3*f* and FIG. 6 of the drawings, a first embodiment of the game 16 played on the gaming machine 10** is described.

In the game 16, it is assumed that a special symbol, indicated as a bonus symbol 42 in FIGS. **3*b* to 3*f* of the drawings, is a substitute symbol which substitutes for all other symbols and that left-to-right pays apply. Also, in the example described below with reference to FIGS. 3*a* to 3*f*** of the drawings, it is assumed that five standard paylines are being played.

When the player places a bet, the relevant button of the bank 22 of buttons is actuated to simulate spinning of the reels 18. When the reels 18 stop spinning, any prize winning combinations pay a prize. In respect of a base game result shown in FIG. **3*a*** of the drawings, the player is paid a prize for 3×K appearing on payline one of the game. As no bonus symbols were revealed, no bonus prizes or substitute prizes are awarded.

Figure 3A:
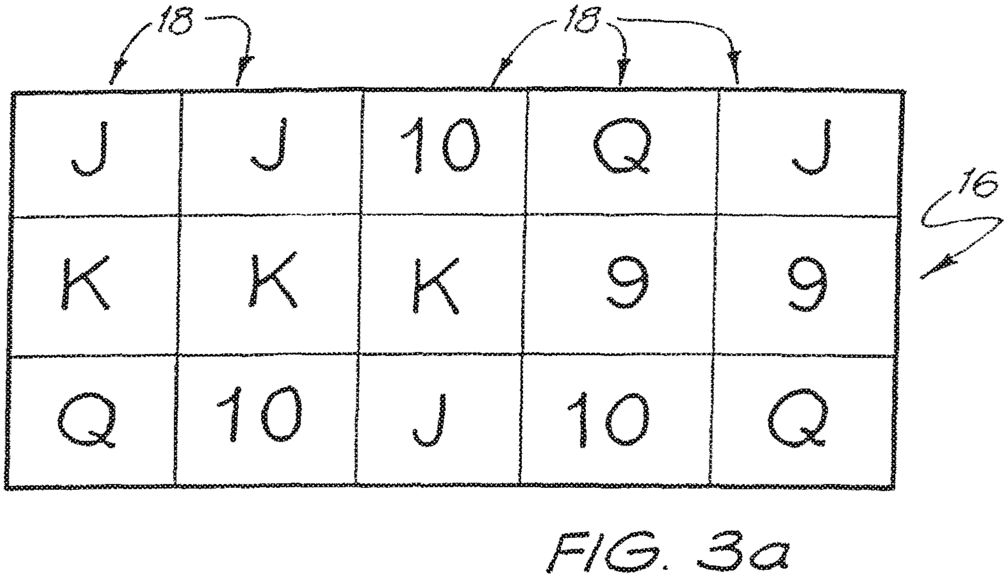
FIGS. 3*a* to 3*f* show screen displays of an embodiment of a game played on the gaming machine of FIG. 1.
Figure 3B:
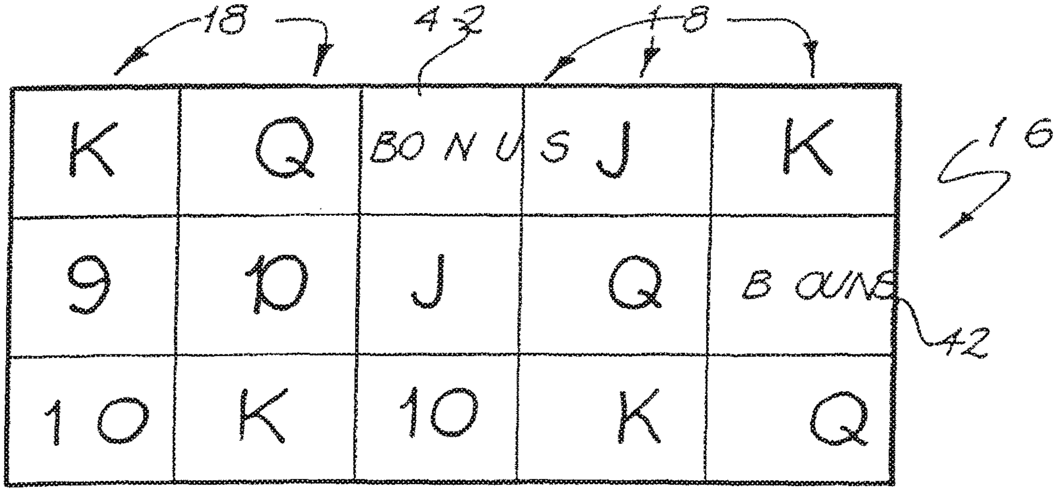
Figure 3C:
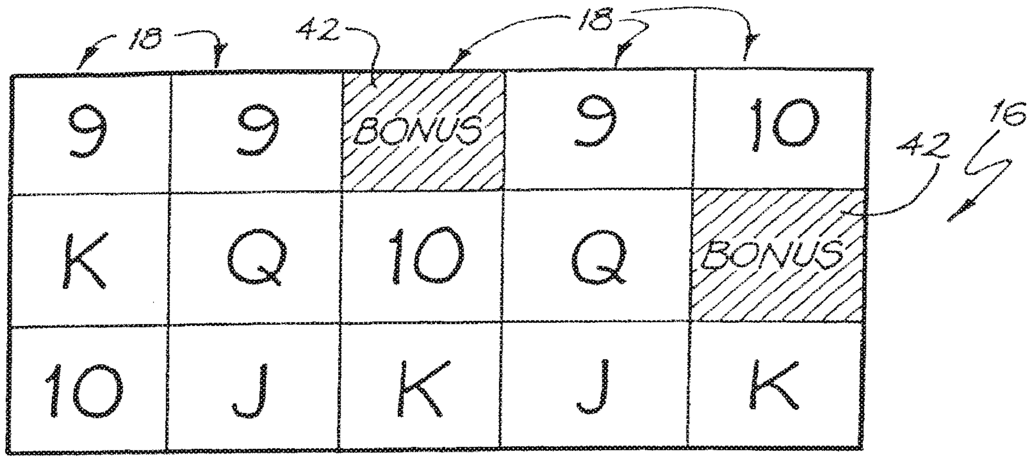
Figure 3D:
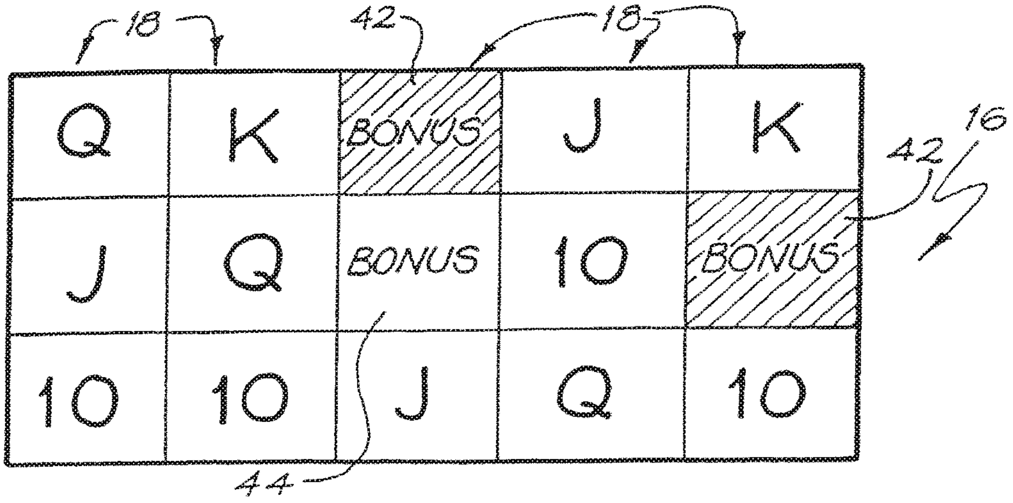
Figure 3E:
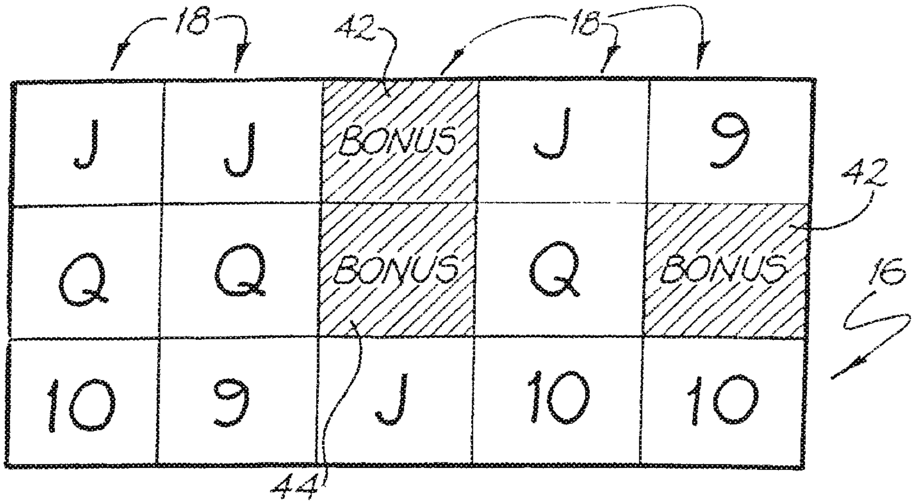

Upon placing the next bet, the player again causes the reels 18 to spill and the result is as shown in FIG. **3*b* of the drawings with two bonus symbols occurring. Due to the presence of the bonus symbol 42 on the third reel, a prize is paid for 3×10 on payline five with the bonus symbol 42 on the third reel 18 substituting. The two bonus symbols 42 are then held for the next ten bought games and, as shown in FIG. 3*c* of the drawings, when the reels 18 are re-spun after a bet has been placed by the player, the bonus symbols 42 are highlighted. This occurs for all spins of the reels 18 during which the bonus symbols 42** remain in position.

When the reels 18 are spun, the bonus symbols 42 appear to "lift" off their reels 18 and remain in place on the screen 16. The highlighted bonus symbols 42 thus appear to be superimposed over the underlying reels 18 so that the effect is of the reels 18 spinning behind the bonus symbols 42. To enhance this effect, the bonus symbols 42 may have degree of transparency.

In FIG. **3*c* of the drawings, the result of the spinning of the reels is that the player is awarded a prize for 4×9 on payline two with the bonus symbol 42 on the third reel 18** acting as a substitute.

When the player places a bet and spins the reels 18 for the next game, a further bonus symbol 44 is spun up as shown in FIG. **3*d*** of the drawings. It too will be held in place for the following ten, bought games.

As there were no prize winning combinations on any of the five active paylines, no prizes are awarded for the game shown in FIG. **3*d*** of the drawings.

Figure 3F:
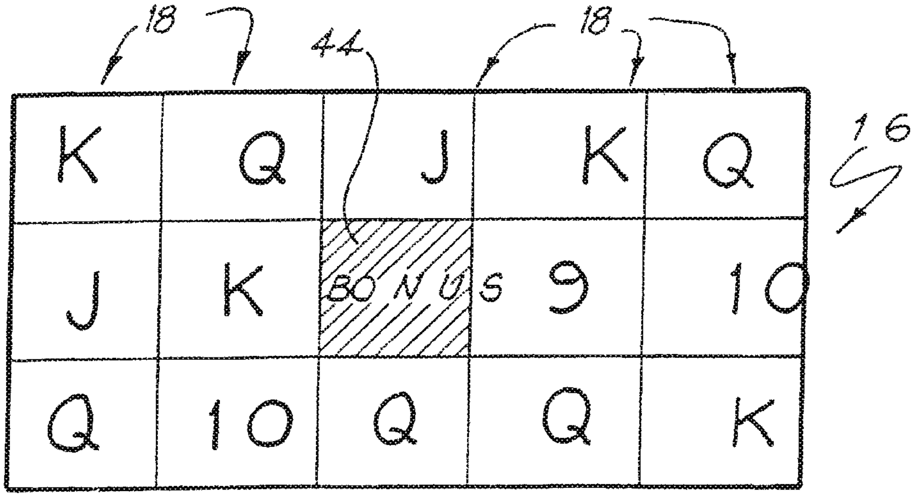

For the next game, all three bonus symbols, being the two bonus symbols 42 and the bonus symbol 44 are held while the reels 18 are spun. For the game shown in FIG. **3*e* of the drawings, a prize is paid for 4×J on payline two and 5×Q on payline one. After the tenth game following the game in which the two bonus symbols 42 occurred, those two bonus symbols 42 which had been held disappear. However, the bonus symbol 44 will continue to be held for another two games. Hence, when the player next causes the reels 18 to spin, the result is as shown in FIG. 3*f*** of the drawings. In this game, there are no prize winning combinations on any of the five active paylines and, accordingly, no prizes are awarded.

It is also to be noted that the bonus symbol may overlie more than one underlying symbol on its associated reel 18, substituting for each underlying symbol.

Figure 4:
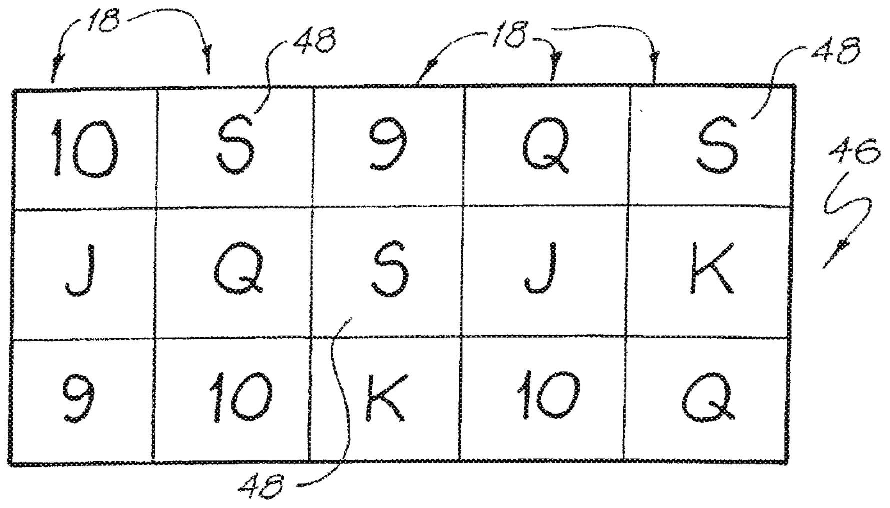
FIG. 4 shows a screen display of a base game of a game, in accordance with another embodiment of the invention, which is played on the gaming machine of FIG. 1.

Referring now to FIGS. 4, **5*a* to 5*c* and 7 of the drawings, a second embodiment of the game 16 played on the gaming machine 10 is described. With reference to FIGS. 3*a* to 3*f*** of the drawings, like reference numerals refer to like parts unless otherwise specified.

In this embodiment of the invention, a display screen of a base game result is shown at 46 in FIG. 4 of the drawings. Three scatter symbols 48 are spun up. A prize is paid for the three scatter symbols 48. Further, the presence of the three scatter symbols 48 constitutes a trigger condition. The trigger condition commences ten free games during which all bonus symbol 42, 44 will be held. The bonus symbols 42, 44 substitute for all underlying symbols, except the scatter symbols 48. The symbols underlying the bonus symbols 42, 44 are still applicable such that, if a scatter symbol is spun up and appears beneath the bonus symbol, it may still award scatter wins and, where applicable, add another ten free games to those remaining, as will be described in greater detail below.

FIG. **5*a* shows a display screen 50 of a first free game in the series of free games. Because the bonus symbol 42** acts as a substitute symbol, it substitutes in its position and, accordingly, a prize is paid for 5×Q.

The bonus symbol 42 is held in place for the nine remaining free games and remains visible.

After the second free game, a display screen 52 of which is shown in FIG. **5*b* of the drawings, a symbol which underlies the bonus symbol 42 is visible through the bonus symbol 42. In this case, a J symbol 54** is visible. No prize winning combinations result in the second free game and, accordingly, no prizes are awarded.

In the third free game, a display screen of which is shown as 56 in FIG. **5*c* of the drawings, a second bonus symbol 44 is spun up on the fourth reel 18. The initial bonus symbol 42 remains in place and a symbol of the second reel 18 is spun up behind the bonus symbol 42 to be visible through the bonus symbol 42. In this case, a further three scatter symbols 48, one being behind the bonus symbol 42**, are spun up. This serves as a further trigger condition resulting in a further series of free games being awarded. The free games of the further series of free games are added to any remaining free games from the initial series of free games.

Accordingly, in the present example, the further ten free games are added to the remaining seven free games from the initial series of free games. For all of the seventeen free games which remain, the two displayed bonus symbols 42, 44 will remain in place over the reels 18. It will be appreciated that any bonus symbol (not shown) which is spun up in any subsequent free games will also be held for the remaining games of the sum of the initial series of free games and the further series of free games plus any additional series of free games which may arise.

Figure 5A:
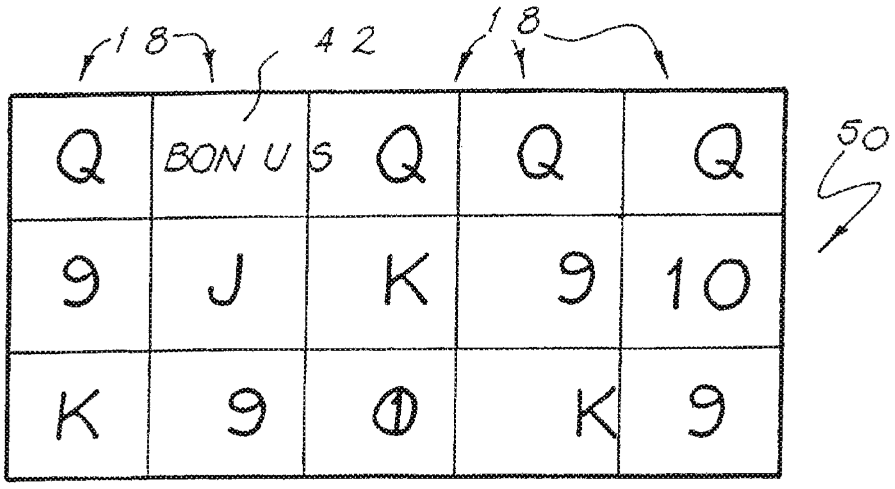
FIGS. 5*a* to 5*c* show screen displays of free games following the base game of FIG. 4.
Figure 5B:
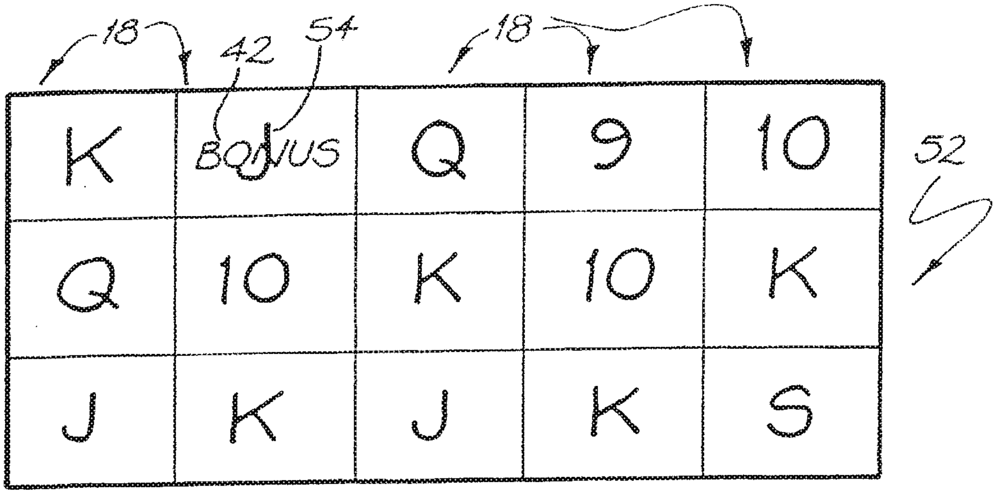
Figure 5C:
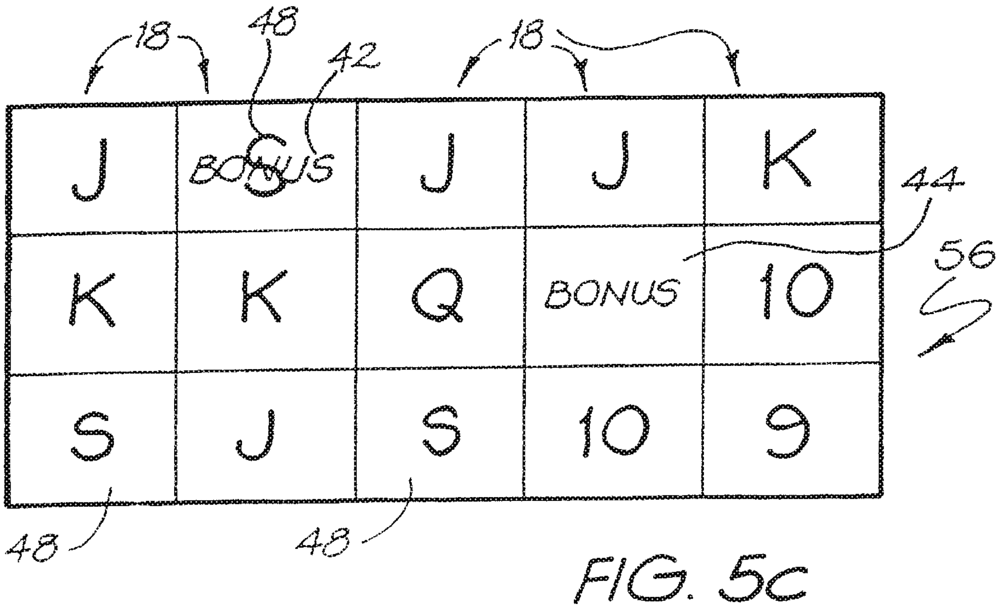

In the game illustrated in FIG. 5c of the drawings, the bonus symbol 42 acts as a substitute symbol so that a prize is paid for 4×J. However, the underlying scatter symbol 48 still applies; hence the awarding of the further series of free games.

Hence, it is all advantage of the invention that a feature is provided which the applicant believes will enhance player interest in games played on the gaming machine 10.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine for providing a wagering game operable upon a wager by a player, the gaming machine comprising:

a credit input mechanism configured to receive a physical item associated with a monetary value for establishing a credit balance, the credit balance being increasable and decreasable based on wagering activity;

a player interface configured to receive a player selection;

a display having a display area;

a payout mechanism configured to make a payout based on the credit balance; and a game controller configured to execute instructions stored in a memory, which when executed by the game controller, cause the game controller to at least:

display, in the display area, a plurality of symbol positions for a plurality of reels;

select a plurality of symbols and display the plurality of symbols in the plurality of symbol positions for the plurality of reels;

upon occurrence of a predetermined trigger condition, commence a series of free games during which a special symbol displayed in any of the plurality of symbol positions is held in that symbol position in a superimposed representation over a corresponding reel for remaining free games in the series of free games; and identify and award a prize for predefined winning combinations of the plurality of symbols including the special symbol;

wherein the special symbol, when displayed, substitutes for at least one other symbol of the corresponding reel.

2. The gaming machine of claim 1, wherein the predetermined trigger condition is dependent on the special symbol.

3. The gaming machine of claim 1, wherein the predetermined trigger condition includes the plurality of reels displaying one or more scatter symbols in the wagering game.

4. The gaming machine of claim 1, wherein the predetermined trigger condition is independent of the special symbol.

5. The gaming machine of claim 1, wherein the predetermined trigger condition occurs randomly.

6. The gaming machine of claim 1, wherein, if the predetermined trigger condition reoccurs in one free game of the series of free games, a second series of free games is awarded.

7. The gaming machine of claim 6, wherein the free games of the second series of free games are added to the remaining free games of the series of free games.

8. The gaming machine of claim 7, wherein any special symbol held during one free game of the series of free games is also held for at least one free game of the second series of free games.

9. A method for a gaming machine that provides a wagering game operable upon a wager by a player, the method comprising:

in response to a credit input mechanism of the gaming machine receiving a physical item associated with a monetary value, establishing a credit balance that is increasable and decreasable based on wagering activity;

selecting, with a game controller of the gaming machine, a plurality of symbols;

displaying the plurality of symbols in a plurality of symbol positions for a plurality of reels of the gaming machine;

in response to a predetermined trigger condition, commencing a series of free games during which a special symbol displayed in any of the plurality of symbol positions is held in that symbol position in a superimposed representation over a corresponding reel for remaining free games in the series of free games; and identifying and awarding, with the game controller, a prize for predefined winning combinations of the plurality of symbols including the special symbol, wherein the special symbol, when displayed, substitutes for at least one other symbol of the corresponding reel.

10. The method of claim 9, wherein the predetermined trigger condition is dependent on the special symbol.

11. The method of claim 9, wherein the predetermined trigger condition includes the plurality of reels displaying one or more scatter symbols in the wagering game.

12. The method of claim 9, wherein the predetermined trigger condition is independent of the special symbol.

13. The method of claim 9, wherein the predetermined trigger condition occurs randomly.

14. The method of claim 9, further comprising awarding a second series of free games is awarded in response to the predetermined trigger condition reoccurring in one free game of the series of free games.

15. The method of claim 14, further comprising adding the free games of the second series of free games to the remaining free games of the series of free games.

16. The method of claim 15, further comprising holding any special symbol held during one free game of the series of free games for at least one free game of the second series of free games.

* * * * *